Sept. 6, 1938.  B. W. TWYMAN  2,129,389
STEERING GEAR
Filed May 20, 1936
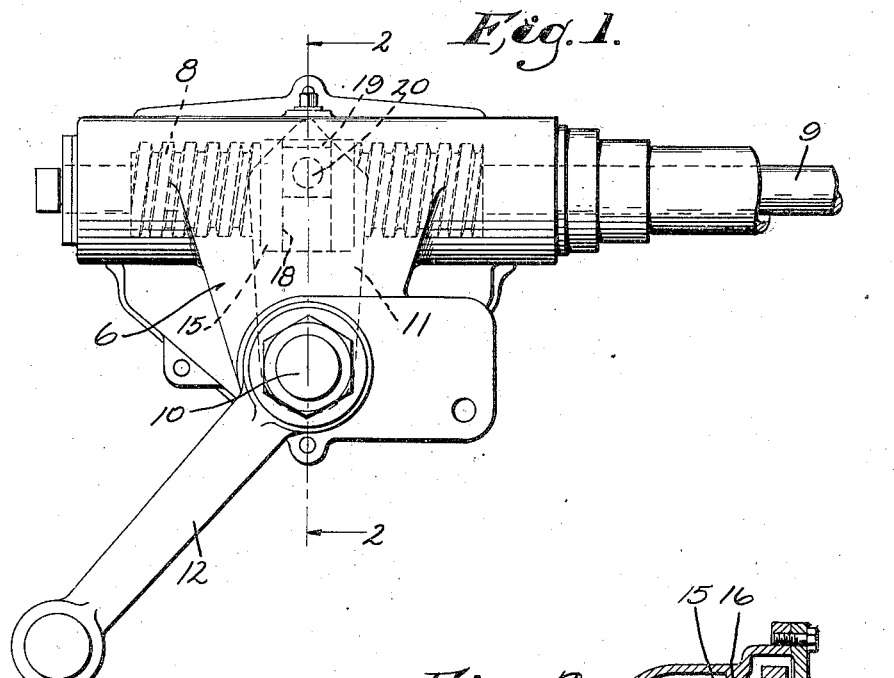
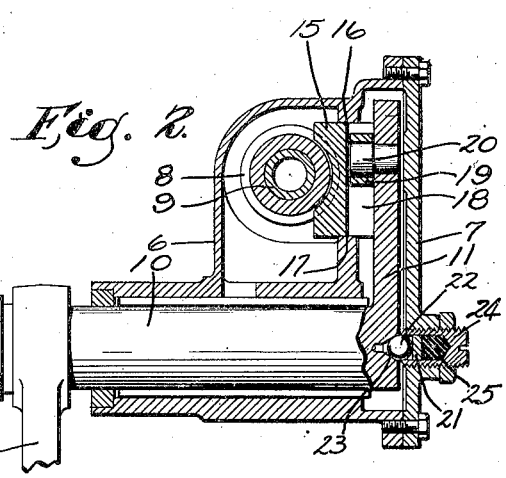
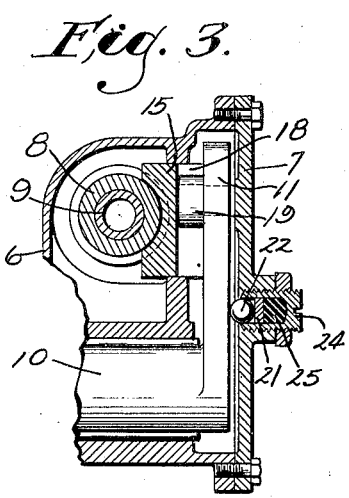
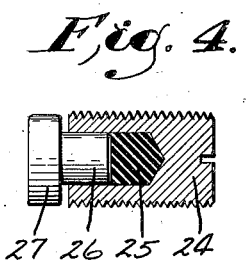
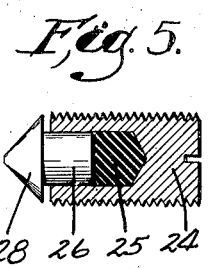
INVENTOR
B. Wickliffe Twyman
BY
Wheeler, Wheeler & Wheeler
ATTORNEYS Patented Sept. 6, 1938

2,129,389

UNITED STATES PATENT OFFICE 2,129,389

STEERING GEAR

B. Wickliffe Twyman, Milwaukee, Wis., assignor to Lavine Gear Company, Milwaukee, Wis., a corporation of Wisconsin Application May 20, 1936, Serial No. 80,741

5 Claims. (Cl. 74—497)

This invention relates to improvements in steering gears.

It is my purpose to minimize road shock transmission through a steering gear; to minimize wheel fight; to overcome a fault in steering gear construction which frequently makes the gear feel unduly "soft" at the center of its range of movement; to compensate automatically for inequalities of machining which in many steering gears lead to sticking unless the gear is so adjusted as to be very "soft" in its operation and, to remedy faulty self-correction. In a well made steering gear of proper design the gear will be "self-correcting" in that the "gather" of the vehicle wheels will tend to restore the gear to central position after the gear has been moved toward the end of its range for the purpose of turning a corner. Some steering gears, however, without any obvious reason, may be self-correcting from one end of the range but not from the other. By means of the present invention such a faulty gear may be instantly rendered self-correcting from all points of its range.

It is another object of the invention to provide means for accomplishing the purposes aforesaid by slight and inexpensive modification of existing steering gears.

In the drawing:

Figure 1 is a side elevation of a commercial type of steering gear to which my invention is applicable.

Figure 2 is a view taken in section in the plane indicated at 2—2 in Figure 1, to illustrate the application of my invention to the steering gear.

Figure 3 is a view similar to Figure 2 fragmentarily illustrating a modified application of the invention to the gear.

Figures 4 and 5 are enlarged detail views in axial section showing modified embodiments of the device which I add to the gear for the purposes of the present invention.

Like parts are identified by the same reference characters throughout the several views.

In the steering gear shown in Figs. 1, 2 and 3, I have provided a gear casing 6 having a removable closure plate 7 and containing suitable bearings of any desired form for a worm cam 8 mounted on a drive shaft 9 above a transversely disposed rock shaft 10 having an interior arm 11 and an exterior arm 12 from which the motion transmitted through the gear is delivered to the steering wheels.

The connection between the worm cam 8 and the arm 11 may be effected in any desired manner. I have illustrated a cam follower 15 guided between the bearing surfaces 16 and 17 of the case and meshing with the threads of the worm cam 8. In its rear face the cam follower 15 has a vertical slot 18 in which operates a slide 19 in which is journaled a pin 20 fixed in the arm 11.

It will be noted from Fig. 1 that the threads of the worm cam 8 have a definite taper from their bases toward their outer peripheries. It is believed that the existence of this taper probably contributes markedly to the achievement of some of the surprising results which follow from the incorporation of a special thrust bearing in the gear.

It has long been conventional practice to resist end thrust on the rock shaft 10 by means of a thrust bearing aligned with the axis of that shaft and provided with a means for taking up wear between the worm cam and cam follower, and between the cam follower and the arm 11. In commercial gears I have for some time used for this thrust bearing an ordinary hardened steel ball bearing such as that shown at 22, seated in the center pin socket 23 of the rock shaft and operating against the hardened end of a set screw threaded into the casing. I found that the hardening of the set screw was desirable, if not essential, to avoid undue wear between parts. There is a very high thrust at this point, and I found that unless the set screw was hardened the ball would occasion some wear. In ordinary manufacturing processes the point at which this wear occurred could not always be brought into axial alignment with shaft 10 so that when the screw was turned up for adjustment the socket made by the ball might be eccentric and might cause some difficulty in effecting proper adjustment. For this reason, rather than because of any objection per se to the socketing of the set screw by the ball, it was desirable to avoid any wear.

The objectives of this invention as heretofore listed have been among the results constantly sought by steering gear manufacturers. It has, however, seemed inevitable that if the vehicle wheel encountered a sudden shock upon the road such shock, or a substantial portion thereof, would be transmitted through the steering gear to the steering wheel, reduced only by the ratio or mechanical advantage of the gear itself. It has also seemed impossible to make steering gears with such perfection as to eliminate all inequalities in standard production. Even a steering gear with a ground worm cam finished with the utmost nicety may be found to stick at some point if tightly adjusted, and in order to make the gear operate freely at that point it has been necessary to loosen the adjustment to such an extent that the gear feels "soft" or loose at other points in its range of operation.

I have now found that these and the other objectives above listed are all achieved by the use of a non-resilient thrust bearing. In accordance with this invention I seat the ball 22 upon a disk 21 in the socket of a hollow set screw 24. Beneath this disk I insert a packing 25 which I prefer to make of molded rubber or, if desired, it may be made of a short section of rubber rod. As alternatives, I may substitute for the ball 22 and disk 21 a plunger 26 having a head 27 as shown in Fig. 4, or I may use a different form of head as shown at 28 in Fig. 5. The ordinary working tolerances amounting to one or more thousandths of an inch allow the disk 21 or the plunger 26 to adjust itself upon the cushion within the socket of the set screw 24 to accommodate any minor inequalities in the operation of the gear. If desired, the set screw 24 and any suitable bearing element such as the ball 22, may be positioned above the axis of the rock shaft as shown in Fig. 3.

It is, of course, known that rubber is virtually incompressible. Yet its ability to be displaced readily permits of the accommodating movements above described. Much more, however, is accomplished by this device because of the fact that the rubber, or other cushions employed at this point, is non-resilient and acts to damp the reaction heretofore transmitted to the steering gear.

Assuming that the road wheels of the vehicle are subjected to a severe shock, the motion will obviously be transmitted through the steering linkage and the arm 12 to the rock shaft 10 and thence through the arm 11 to the cam follower, and from the cam follower to the worm cam 8. Since the steering shaft and wheel are held fast in the hands of the operator, there will be a tendency for the beveled surfaces of the threads of the worm cam to develop a reaction in a direction to thrust the cam follower 15 out of mesh. This reaction is resisted by the thrust bearing against which the end of the rock shaft is seated. If this thrust bearing be of steel, either hardened or unhardened, and particularly if it be hardened, it will have a "Brinell" reaction of such a nature as to reflect the shock directly back to the worm cam and force the response of the steering shaft and wheel. Any material such as rubber or rubber substitute, fiber, liquids under compression, or even lead or the like, while virtually noncompressible, will eliminate this rebound phenomenon or undue resilience and will thus absorb the shock.

Similarly, wheel fight is corrected. The wheels tend to stay in the position to which they are adjusted by the gear unless that position is sufficiently far off center so that the "gather" of the road wheels causes correction. Faulty correction in existing gears has been entirely rectified by simply substituting the thrust member herein disclosed for the conventional thrust member heretofore used.

Likewise, gears having a tendency to stick if adjusted tightly have, by the simple expedient of substituting this thrust bearing, been made to operate smoothly over their entire range even when the thrust bearing was turned up as tightly as it could be turned with a screw driver. Although the rubber employed is virtually noncompressible and consequently cannot be relied upon for any appreciable yielding movement in such tight adjustments, its very lack of "hardness" seems to be responsible for the phenomena noted in its use. Rubber or rubber substitutes such as those now commonly available and which are resistant to deterioration in the presence of lubricants, are preferred to the other materials mentioned, but any material which is lacking in "Brinell" reaction and is preferably substantially noncompressible, may be used for the purposes of this invention.

In a companion application entitled "Thrust shock damper" I am claiming the damper per se for uses other than in the steering gears.

I claim:

1. In a steering gear, the combination with a drive shaft and driven shaft, and motion transmitting connections between said shafts tending to move the driven shaft axially in one direction in reaction to thrust developed between said shafts, of a thrust bearing opposing the movement of said rock shaft in said direction and comprising a non-metallic cushion having means confining it against substantial distortion.

2. In a steering gear, the combination with a driven rock shaft, of an end thrust bearing therefor including an adjustable member, and a substantially noncompressible non-metallic cushion having means confining it against substantial distortion, said cushion being interposed between said adjustable member and said rock shaft and comprising a shock damp medium therebetween.

3. In a steering gear, the combination with a rock shaft, of an end thrust bearing therefor comprising an adjustable member, a non-metallic cushion, means confining said cushion against distortion, and a bearing element interposed between said cushion and said rock shaft.

4. In a steering gear, the combination with an oscillatable part and an adjustable part movable axially to and from the oscillatable part, one of said parts being provided with a socket, of a relatively incompressible cushion confined within said socket, and bearing means interposed between said cushion and the other of said parts.

5. In a steering gear, the combination with a worm cam having a tapered thread, of a cam follower engaged with said thread to be actuated thereby and tending to be ejected from said thread by the thrust of the tapered portion thereof, a driven oscillatory part connected with said follower in supporting thrust receiving relation thereto, a thrust bearing part adjustably mounted for axial movement to and from said first mentioned part, one of said parts being socketed, and a substantially noncompressible cushion in a socketed part in thrust receiving relation to the other of said parts, whereby adjustably to take up wear and nonresiliently to damp the shock reaction.

B. WICKLIFFE TWYMAN.